United States Patent Office 3,219,433
Patented Nov. 23, 1965

3,219,433
PRODUCTION OF A FERTILIZER PELLET CONTAINING AN ACTIVE FERTILIZER INGREDIENT IN A HYDROCARBON SOLID
Phillip W. Brewster, Bright's Grove, Ontario, and Robert E. Emond, Mooretown, Ontario, Canada, assignors to Esso Research and Engineering Company, a corporation of Delaware
No Drawing. Filed Apr. 8, 1963, Ser. No. 271,451
3 Claims. (Cl. 71—64)

The present invention is concerned with improved control-availability agricultural compositions. The invention more particularly relates to fertilizer compositions having improved properties with respect to the rate of release of nutrients for plant growth. More particularly the invention is concerned with fertilizer compositions in which the particles of mineral nutrients are impregnated or coated with solid hydrocarbons of the nature of paraffin waxes, asphalts and petroleum resins. A preferred composition comprises a fertilizer composition in which is incorporated a solid petroleum hydrocarbon. The compositions of the present invention may also comprise a solid petroleum hydrocarbon having incorporated therein pesticides such as herbicides, fungicides and insecticides. These compositions may be prepared to act as fruit tree dust, tomato plant dust, potato plant dust and the like.

In accordance with a specific adaptation of the present invention, improved commercial fertilizers are secured by commingling the fertilizer with a solid hydrocarbon and thereafter heat treating the same. A patricularly desirable fertilizer is secured by mixing a powdered fertilizer with a water-insoluble binder and thereafter grinding the mixture until the resulting powder is homogeneous. The homogeneous powder is then slurried with water and heated in a rotary drum to produce granules from which the nutrients are leached at a slower rate than from non-matrix granules.

It is well-known in the art to use various agricultural aids such as fertilizers, herbicides, fungicides, insecticides and fruit dust containing active control ingredients. These active control ingredients are normally used with various carriers such as with inert solid materials, aqueous solutions and other solvents and the like. For example, fertilizers for promoting plant growth are of two basic types. The oldest type comprises natural organic materials, which have certain disadvantages: e.g., their decreasing supply and low nutrient level are inadequate to maintain sufficient food for our ever increasing population. The second type of fertilizer is known as commercial mineral fertilizer mixture and consists largely of organic and inorganic compounds of nitrogen, phosphorus and potassium. Commercial fertilizers have a number of disadvantages. The readily soluble nitrogen compounds may cause injury to crops and may be readily leached into the lower soil layers where the roots of the plants cannot absorb them. Also the inorganic phosphorus nutrients of the fertilizers tend to become fixed by the clay colloids in the soil and are thus not available to the plants in adequate quantities. Additionally with some legume and grass crops the initially high absorption of potassium as well as nitrogen from readily soluble fertilizers may create a toxic condition with resultant injury to the plants.

Because of the inherent disadvantages in both the natural organic fertilizers and the mineral fertilizer mixtures, there has been a need for increasing quantities of fertilizer compositions whose nutrient components are released slowly. While many attempts have been made to overcome the disadvantages of the organic and mineral fertilizers, none of the solutions to the problem thus far advanced has been entirely satisfactory.

Thus, it is the object of the present invention to proprovide agricultural compositions such as fertilizer compositions and a method of production thereof in which the active material such as nutrient constituents are released over an extended and predetermined period of time. For example, fertilizer compositions unite the benefit of mineral and organic fertilizers. Crop injury is minimized and the efficiency with which the nutients are supplied to the plants, shown by greater rate of growth is increased. Thus, in accordance with one adaptation of the present invention, commercial fertilizers are coated or impregnated with solid hydrocarbons. The fertilizer may be coated or impregnated as a finished formulation prior to final packaging, or each one of the fertilizer components may be coated or impregnated before blending. The treating is accomplished either by dipping the fertilizer into the molten hydrocarbon, by spraying the hydrocarbon onto the surface of the fertilizer, by ejecting liquid fertilizer and hydrocarbon into a common stream to form "prills" or by adding the molten hydrocarbon to the fertilizer while it is being mixed. The term "incorporating" is intended to cover all of these methods of treating the fertilizer with the petroleum hydrocarbon.

Preferably the hydrocarbons comprise petroleum waxes, most desirably those of the microcrystalline type, although petroleum asphalts and petroleum-derived resins (e.g., steam cracked resins) may also be employed. Also contemplated are blends of waxes with asphalts and/or petroleum resins as well as blends of asphalts with the resins. For example, a mixture of a microcrystalline wax or a paraffin wax with from 5 to 10 percent of a petroleum resin might be used. The amount of wax, asphalt, or resins or blends thereof used may be within the range or from 0.1 percent to about 25 percent by weight of the total composition, although the preferred range is from about 3 percent to 10 percent based on the weight of the fertilizer.

In accordance with a preferred adaptation of the present invention, the composition comprises homogeneous pellets of the active ingredient and the solid hydrocarbon as, for example, the wax. This is to be distinguished from pellets of active ingredients coated with a solid hydrocarbon. When using a pellet of this latter character, once the coating is broken, the active ingredient will leach rapidly away. Thus, in the earlier stages substantially no active agricultural ingredient is imparted to the growing plant and when the coating is broken, the rate rapidly increased. By utilizing a pellet homogeneously mixed therethrough with the active fertilizer and the wax or the active pesticide and the wax, a uniform release of the active agricultural ingredient is secured.

Thus, for example, a desirable fertilizer composition is one which comprises a fertilizer in which is incorporated from 0.1 to 2.5% by weight of a solid hydrocarbon as, for example, a petroleum wax or a petroleum asphalt or a petroleum resin. One method of preparing the composition of the present invention is to incorporate the hydrocarbon in the fertilizer by mixing the fertilizer with the hydrocarbon in a molten state and then allowing the hydrocarbon to solidify. The solid mass may be broken down into pellets of the desired dimensions by any suitable means. It is obvious that the pellets will be homogeneous throughout with respect to the hydrocarbon and the active ingredients such as the fertilizer.

The fertilizer compositions using a solid hydrocarbon as, for example, a wax, may comprise any fertilizer containing nitrogen, phosphorus, potash and other growth promoting agents. The invention, in essence, comprises the use of these growth promoting agricultural agents as a pellet wherein the growth promoting agent and the hydrocarbon are uniformly and homogeneously distributed throughout the pellet. With respect to the use of pesticide compositions, it is known in the art to use agricultural chemicals such as 2,4-D (1) 2,4-dichlorophenoxyacetic acid and aldrin (2) aldrin-1,2,3,4,10,10-hexachloro-1,4,4a,5,8,8a-hexahydro-1,4 - endo,exo - 5,8 dimethanonaphthalene as emulsifiable concentrates, wettable powders and dusts. It is also known to use herbicides and insecticides which have been incorporated with granular solids such as atapulgite clay or vermiculite. The product is used as a dry material containing about 5 to 25% active ingredient. These pesticides were used, for example, to control wireworms, grasshopper, root maggots, and carrot rust fly. Thus, it is apparent that the pellets may comprise homogeneous distribution throughout the pellet of the wax, the fertilizer and the pesticides.

One advantage of the pellets of the present invention over dusts and sprays is that the materials fall directly on the infested area without drifting to adjacent susceptible plants, and release the pesticide and/or nutrient at a predetermined uniform rate. Other herbicides such as 2,4,5-T (2,4,5-trichlorophenoxyacetic acid), monuron (3-p-chlorophenyl-1,1-dimethylurea), dieldrin (1,2,3,4,10,10-hexachloro-exo - 6,7 - epoxy-1,4,4a,5,6,7,8,8a-octahydro-1,4-endo,oxo-4,8-dimethanonaphthalene) may be used as hereinbefore described.

The particle size of the pellets may vary appreciably. However, it is preferred that these pellets be below about 2 inches, preferably in the range from about 0.1 to .5 inch in diameter.

As pointed out heretofore, the present invention is specifically concerned with the preparation of high quality pellets by the heat treatment thereof. Thus, for example, by heat treating coated fertilizers within a critical temperature range, these fertilizer pellets are rendered completely free running and are not tacky. Thus in accordance with the present invention, it has been found that the heating of these coated granules causes the petroleum product to impregnate the fertilizer mass and leave the granule free-flowing.

In order to illustrate the invention, a number of operations were conducted utilizing various coating materials and (10-10-10) fertilizer (10 nitrogen, 10 phosphorus as $P_2O_5$, and 10 potassium as $K_2O$). The results of these tests are illustrated in the following table.

TABLE I.—EFFECT OF HEATING ON HANDLING PROPERTIES OF COATED FERTILIZER

| Fertilizer Coating | Handling Properties | |
|---|---|---|
| | No Heating | Heated at 300° F. |
| 5% Slack Wax | Free running—blocks over 2 p.s.i. | Completely free running. |
| 10% Slack Wax | Tacky—Runs when cold | Do. |
| 5% Asphalt (130 SP) | Very tacky—no running properties. | Do. |
| 10% Asphalt | Agglomerates completely | Do. |
| 5% Asphalt/Wax (50/50 mixture). | Very tacky | Do. |

The temperature of heating and the duration of heating are important factors and determine the properties of the final product. The temperature of heating determines the time necessary to achieve the desired result. At a given temperature the heating period should not be prolonged beyond that necessary to give a free flowing product. Excessive heating may cause the coating to char and the granules to stick together, as in the case of asphalt, or to volatize the coating in the case of waxes. However, the most important reason why heating should not be unduly prolonged is that the leaching rate of the coated granules increases with time of heating.

In general, the time of heating or post-curing of the pellet should be in the range from about 2 to 24 hours, preferably from about 10-14 hours, at a temperature in the range of 200 to 500° F., preferably at a temperature in the range of 275-325° F. A very desirable specific temperature is about 300° F. for a time period of about 24 hours.

Thus, with asphalt the handling properties of the fertilizer by following the present technique are enormously improved while the leaching properties are barely impaired.

Recoating the granules after the first coating and heating is also possible. It has been found that a repetition of the coating and heating process gives improved leaching is also possible. It has been found that a repetition the same as the first. Thus, the first heated coat could be asphalt and this could then be followed by a wax coat.

Satisfactory waxes which may be used in accordance with the present invention are shown in the following Table II.

TABLE II.—INSPECTIONS OF WAXES USED IN TESTS

| Waxes | Melting Point, ° F. | Viscosity at 210° F. | Penetration at 77° F. | Refractive Index at ° F. | |
|---|---|---|---|---|---|
| A | 133.4 | 47.0 | 23 | 1.4431 | 67° |
| B | 125.5 | 38.2 | 19 | | |
| C | 139.2 | 39.8 | 11 | 1.4352 | 67° |
| D | 153.9 | 47.7 | 12 | 1.4371 | 77° |
| E | 135.2 | 59.1 | 23 | 1.4501 | 67° |
| F | 115.0 | 67.0 | 40 | 1.4511 | 67° |

In addition to waxes, other materials may be used such as normally solid asphalts having softening points above about at least 120° F., and preferably above 130° F.

Petroleum asphalts are generally prepared from petroleum residual oils obtained by the distillation of an asphaltic or semi-asphaltic crude oil or thermal tar or by the fluxing of harder residual asphalts with heavy petroleum distillates. Such residual oils are high boiling liquids or semi-solids which may have softening points from about 32° F. to about 120° F. and are generally characterized by specific gravities ranging from about 0.85 to about 1.07 at 77° F. Other properties of such residual oils, normally termed asphalt bases or asphalt fluxes, may vary to a considerable extent depending upon the particular crude oil from which they are derived.

Asphalts prepared from residual oils such as those set forth above may be classified as either straight reduced asphalts or as oxidized asphalts. Straight reduced asphalts are produced by steam distillation, vacuum distillation, blending or solvent deasphalting of residual oils. These operations remove a significant quantity of the lower boiling, more volatile material present in the residual oils and result in a product having a softening point between about 100° and about 170° F., although higher softening points may be obtained by more extensive treatment. Oxidized asphalts are produced by contacting a residual oil with air or a similar oxidizing agent, alone or in the presence of an oxidizing catalyst such as ferric chloride, phosphorus pentoxide or the like. The oxidation process serves to dehydrogenate certain constituents of the asphalt, leading to the evolution of water and some carbon dioxide. Oily constituents are thus converted into resins and resins are converted into asphaltenes. Very little oil is removed during the oxidation operation. The penetration and ductility properties of oxidized asphalts are generally somewhat higher for a given softening point than are those of the straight reduced products. Both straight reduced asphalts and oxidized asphalts are useful in the invention.

Although the petroleum asphalts are preferred, other suitable bituminous material would include coal tar, wood tar, and pitches from various industrial processes. The invention can also be successfully practiced with chemically modified asphalts such as halogenated, e.g., chlorinated or sulfurized or phosphosulfurized asphalts, as well as asphalts treated with epoxides or haloepoxides like ethylene oxide and epichlorohydrin, or with silane halides, nitrobenzene, chlorinated aliphatics such as carbon tetrachloride and halohydrocarbons such as methylene chloride and the like. Additionally, the asphalts can be mixed with minor amounts, e.g., 1 to 10 wt. percent, of other natural and synthetic thermoplastics and thermosetting materials like rubbers, resins, polymers and elastomers, of an oily, resinous or rubbery nature. Nonlimiting examples of suitable materials include polyolefins, polypropylene, polyethylene, polyisobutylene, polymers from steam-cracked naphthas and the like; natural or synthetic rubber-like butyl rubbers, halogenated butyl rubber, polydienes like polybutadiene, elastomeric copolymers of styrene and butadiene, copolymers of ethylene and propylene and the like; epoxy resins; polyalkylene oxides; natural and synthetic waxes; polyvinyl acetates; phenol aldehyde condensation products; and the like and combinations thereof.

Furthermore, in a modification wherein the asphalt is chemically modified by reaction with liquid reagents, for example, CCl4, the reagent liquid can often be used as the asphalt solvent, whereupon the desired reaction occurs before, during or after the compaction of the soil-asphalt cutback mixture, or during or after the curing step, or the reaction may occur continuously during both finishing process steps.

Satisfactory asphalts, for example, are those designated in the trade as fluxes, binders, and various oxidized asphalts. Data on some typical suitable asphalts are shown below:

| Asphalt | Softening Point, °F. | Penetration at 77° F. |
| --- | --- | --- |
| Flux A | <75 | >300 |
| Binder C | 113 | 85–100 |
| Oxidized Asphalt 1 | 180–200 | 24 |
| Oxidized Asphalt 2 | 200–235 | 18 |

The solid material of the stabilized compositions is any dry inorganic solid material, with earth and soil the economically preferred solid materials for the production of hard dense structures useful in building construction. Suitable nonlimiting examples of other aggregate materials include finely subdivided cinder, expanded slag or clay, rock wool, steel wool, abrasives, coke from coal or petroleum, iron ore, diatomaceous earths, clays, soil, silt, coal, asbestos, glass fibers, quartz, carbonate rocks, volcanic ash, and the like and any combination thereof.

Another desirable adaptation of the present invention is a process wherein a powdered fertilizer (such as potassium chloride, ammonium sulfate, or a complete 10–10–10 fertilizer) is mixed with a water insoluble binder and ground until the resulting powder is homogeneous. The powder is then slurried with water and heated preferably in a rotary drum. Under these conditions granules are formed from which the nutrients are leached at a slower rate than from non-matrix granules.

In order to further illustrate the invention, the following example is given.

*Example 1*

180 gms. of potassium chloride and 20 gms. of 30 slack wax were ground to a fine powder in a blender. Forty millilitres of water were added and the whole mixed until a cement-like slurry was obtained. This was placed in a rotary drum in an oven at 450° F. and rotated at 30 r.p.m. for one hour. At the end of this period, small granules of matrix fertilizer were formed in the drum. They were hard, contained no dust, were completely resistant to blocking and showed improved leaching properties over untreated potassium chloride.

The amount of binder used may vary in the range from about 5 to 30%, preferably in the range of about 10–15% as compared to the amount of fertilizer present by weight. The amount of water used is preferably in the range from about 25 to 50% by weight based upon the amount of fertilizer used, preferably in the range of 30–35% by weight. The preferred temperature of heating in the rotary drum is in the range of about 375° F. to 525° F., preferably from about 440 to 460° F. The drum is rotated preferably in the range from about 20–50 r.p.m. per minute for a time period in the range of ½ to 3 hours.

The compositions of this invention have the following desirable advantages: By reducing the solution rate of nitrogen and potash in early stages of plant growth, higher concentrations are supplied for later periods of high fertilizer requirement. In addition, there is decreased burning of young seedlings which is often attributed to nitrogen. By reducing the tendency of inorganic phosphorus nutrients to become fixed by the clay colloids of the soil, phosphorus availability is ensured as root development progresses.

In addition to controlling the rate at which the nutrients in the fertilizer are supplied to the soil, the compositions of this invention have the additional advantage, particularly in the case of the wax-coated compositions, that the coating also serves as an energy source for some of the soil organisms.

Several other advantages also accrue from the use of wax-coated fertilizers. These include the following:

(a) The "fluid characteristics" of fertilizer mixtures are improved. Treated fertilizers travel through distributing equipment more readily and the equipment is not subject to the abrasive action and corrosive action of untreated fertilizers. This is particularly true for those blends containing water-soluble phosphoric acid.

(b) Adsorption of moisture by the fertilizer from the air is minimized and hence caking during storage is virtually eliminated. Increased resistance to deliquescence also reduces tendency to corrode farm equipment.

(c) Fertilizer losses from strong winds during field application are decreased since many of the light particles are agglomerated by the coating or impregnation.

(d) In greenhouse practice where large quantities of organic and mineral fertilizers are used and where it would be desirable to add the maximum amount of fertilizer to the soil when preparing to plant the greenhouse crops, a fertilizer of high nutritive value in a slowly soluble form would provide a means of reducing labor costs.

It will be advantageous in some instances to incorporate pesticides and/or fungicides in the compositions of this invention. Thus, 2,4–D weedkiller, benzene hexachloride soil insecticide, mercury fungicides and the like may be dispersed in the molten wax and distributed evenly throughout the fertilizer blend. Suitable wetting agents may also be incorporated to promote distribution of the nutrients into the soil.

Thus, the present invention is concerned with an agricultural pellet having uniformly and homogeneously distributed therethrough an active ingredient and a hydrocarbon solid. By the technique described wherein the active ingredient is incorporated in the hydrocarbon by mixing the active ingredient with the hydrocarbon in a molten state and then allowing the hydrocarbon to solidify, a matrix type of uniformity will be secured throughout the pellet. Thus, the individual granules making up the pellet are coated. As pointed out heretofore, this is to be distinguished from the mere coating of the pellet comprising the active ingredient.

As pointed out heretofore, the particle size may vary appreciably. The pellets may be in the form of beads or of any other geometric configuration such as a pill, cylinder and the like. The size of the pellets may vary appreciably, but are preferably below about 2 inches in any one dimension as, for example, 2 inches in diameter. It is preferred that the particle size of the pellets vary in the range from .1 to .5 inch so as to secure better distribution in application. These pellets may be secured by any means known in the art as, for example, by spray gun production wherein the molten stream is sprayed into the air or other medium, causing solidification of the petroleum hydrocarbon containing uniformly distributed therethrough the active ingredient.

What is claimed is:

1. Improved process for the production of a pellet having uniformly and homogeneously distributed therethrough an active fertilizer ingredient in a hydrocarbon solid which comprises mixing fertilizer with a water-insoluble hydrocarbon solid selected from the class consisting of a petroleum wax, a petroleum asphalt, and a petroleum resin, wherein the amount of hydrocarbon solid present as compared with the fertilizer is in the range of about 5–30% by weight, grinding the mixture to a fine powder, thereafter slurrying the fine powder with water wherein the amount of water present is in the range of from about 25–50% by weight based upon the amount of fertilizer used, thereafter heat drying the mixture at a temperature in the range from about 275–325° F. to produce said pellets.

2. Process as defined by claim 1 wherein the amount of water utilized is in the range from about 30–35% by weight and wherein the slurry is heat dried in a rotary drum for a period from about 10–14 hours.

3. Process as defined by claim 1 wherein the amount of hydrocarbon solid present is in the range of about 5 to 10% by weight.

References Cited by the Examiner

UNITED STATES PATENTS

| | | | |
|---|---|---|---|
| 2,399,987 | 5/1946 | Cordie et al. | 71—64 |
| 2,936,226 | 5/1960 | Kaufman et al. | 71—64 |
| 3,014,783 | 12/1961 | Young | 71—64 |
| 3,024,098 | 3/1962 | Austin et al. | 71—64 |
| 3,070,435 | 12/1962 | Reusser et al. | 71—64 |
| 3,096,171 | 7/1963 | Woerther | 71—64 |

DONALL H. SYLVESTER, *Primary Examiner.*

ANTHONY SCIAMANNA, *Examiner.*